Aug. 12, 1958
H. G. BLACK ET AL
2,847,112
APRON CONVEYOR
Filed May 8, 1957
2 Sheets-Sheet 1
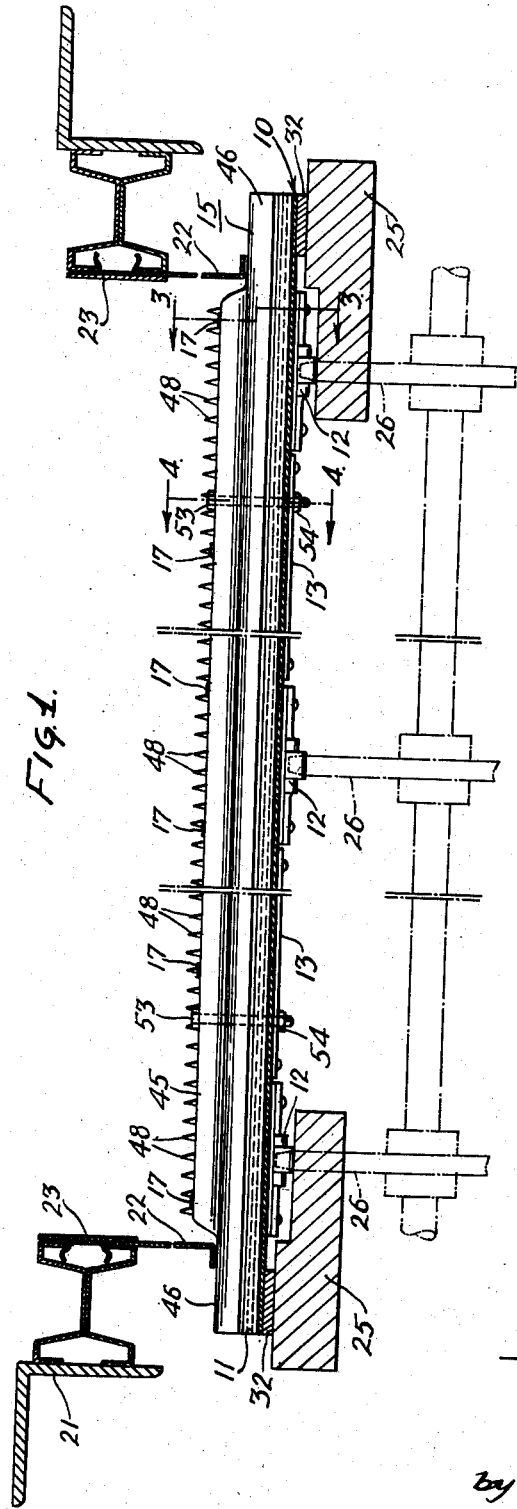
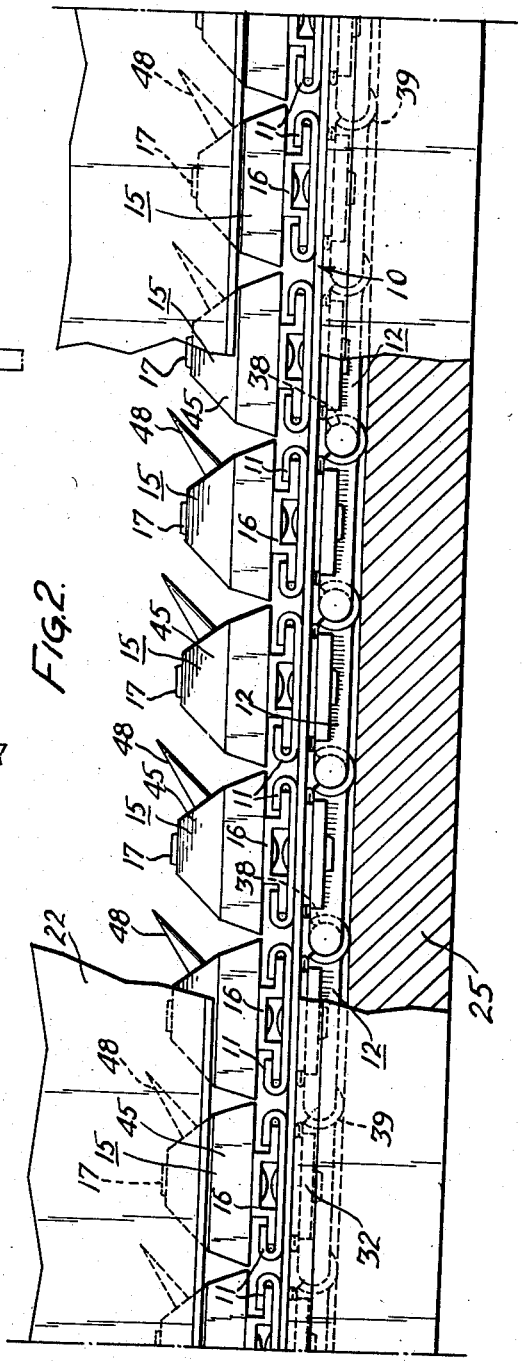
Inventors:
Harold G. Black
Burton A. Arnaiz
Herbert C. Scheufele
by Howson & Howson
Attys.

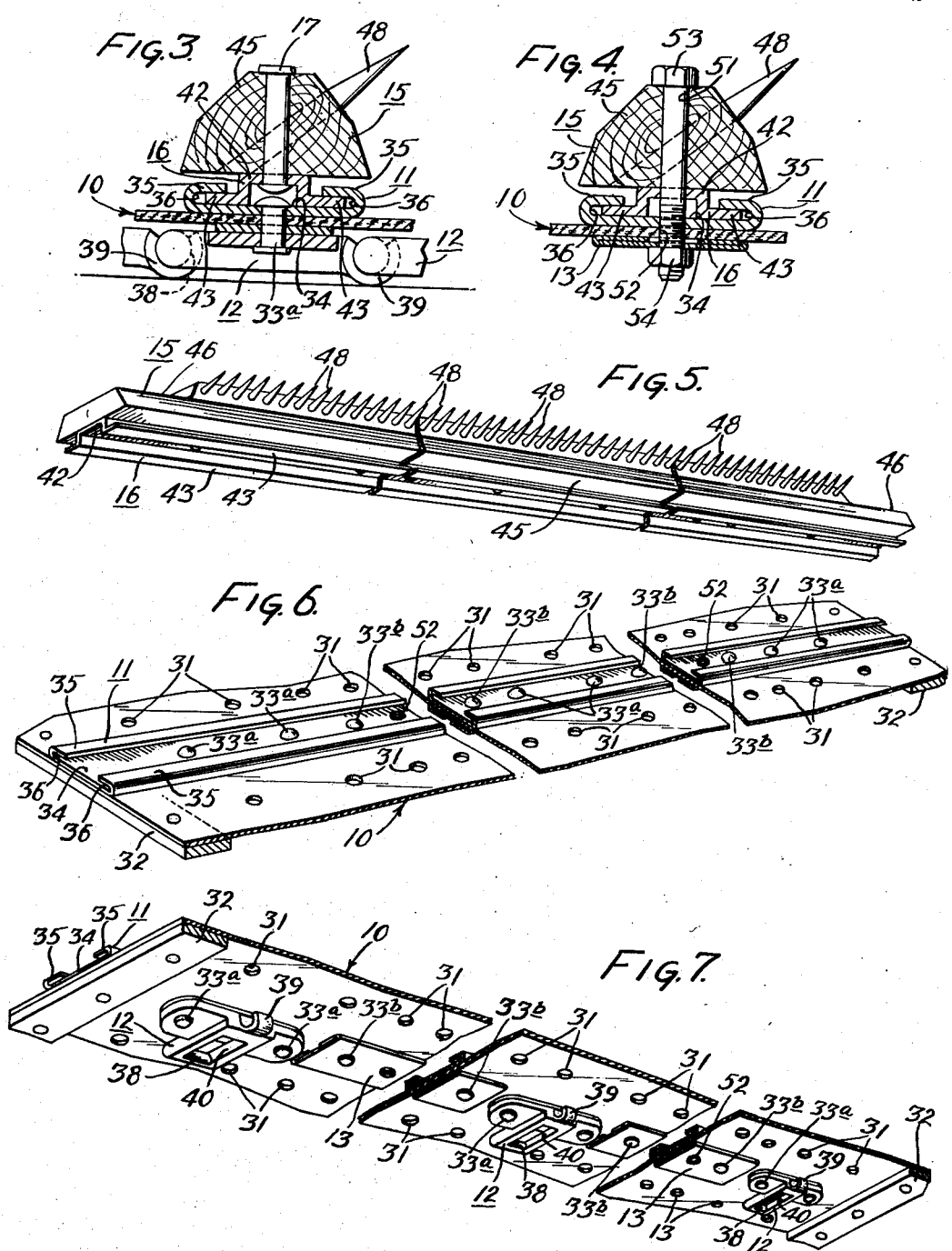

United States Patent Office 2,847,112
Patented Aug. 12, 1958

2,847,112

APRON CONVEYOR

Harold G. Black, Spartanburg, S. C., and Burton A. Arnaiz, Abington, and Herbert C. Scheufele, Philadelphia, Pa., assignors to Proctor & Schwartz, Inc., Philadelphia, Pa., a corporation of Pennsylvania Application May 8, 1957, Serial No. 657,867

3 Claims. (Cl. 198—57)

The present invention relates to apparatus for handling fibrous stock, and more particularly to apron conveyors used for handling fibrous materials and which are subject to damage by foreign material and the like.

In conventional apron conveyors, whenever a slat of the apron, or, in the case of a spike-apron conveyor the spikes, are damaged, it is necessary to shut down the conveyor while repairs are made. Because of the production loss occasioned by such shut-downs, operators frequently continues operating the apparatus in damaged condition in order to avoid the necessity for a shut-down. Such operation is inefficient and the quality of the production suffers.

With the foregoing in mind, a primary object of the present invention is to provide an apron conveyor which affords ready removal and replacement of damaged parts without prolonged shut-down periods.

Another object of the present invention is to provide a slatted apron conveyor in which the slats are interchangeable and may therefore be readily and quickly removed and replaced.

Still another object of the present invention is to provide an apron conveyor of simplified design which is fully effective in operation and use.

All of the objects of the present invention and the various features and details of the construction and operation thereof are more fully set forth hereinafter with reference to the accompanying drawings in which:

Fig. 1 is a transverse sectional view through stock feed apparatus embodying a conveyor made in accordance with the present invention;

Fig. 2 is a view in side elevation with portions broken away of the apparatus shown in Fig. 1;

Fig. 3 is a sectional view taken on the line 3—3 of Fig. 1;

Fig. 4 is a transverse sectional view taken on the line 4—4 of Fig. 1;

Fig. 5 is a detached perspective view of a removable slat of an apron made in accordance with the present invention;

Fig. 6 is a fragmentary top perspective view of an apron with the removable slat removed of a conveyor made in accordance with the present invention; and Fig. 7 is a bottom perspective view of the structure shown in Fig. 6.

The apron conveyor of the present invention comprises a flexible apron 10 having at spaced intervals along its outer surface spaced parallel guides 11 and on its inner surface, chain links 12 and clamps or backing plates 13. Mounted for lateral sliding movement in the guides 11, are slats or flights 15 having on their undersurface slide elements 16 which slidably engage in the guides 11.

In a preferred embodiment of the invention, the apron conveyor is mounted in a housing 21 having sealing strips 22, 22 releasably mounted thereon, for example, by snap strips 23, 23. The housing 21 also includes runners 25, 25 at the opposite sides of the housing for supporting the conveyor in its travel through the housing. The conveyor is advanced on the runners 25, 25 by sprockets indicated in broken lines in Fig. 1 at 26, the teeth of the sprockets engaging the links 12.

The apron 10 comprises an endless sheet of canvas or similar material having along its length spaced series of aligned apertures 31. The spacing of the lines of apertures 31 corresponds to the spacing of the slats 15 longitudinally of the conveyor. The opposite marginal portions of the conveyor are provided with reinforcing wear strips 32, 32 which engage the runners 25, 25 and support the lateral margins of the conveyor. The guide member 11 is secured to the apron 10 by means of rivets 33 passing through the base 34 of the guide, the aperture 31, and the base of the chain link 12 or the clamping member 13.

The guides comprise the base portion 34 and lip portions 35, 35 at the opposite sides thereof which are turned back over the base portion 34 in spaced relation thereto to define grooves 36, 36 for receiving the slide 16 of the slot 15. The chain links 12 are of conventional design, being provided with bars 38 and hooks 39 which interengage, and an aperture 40 for receiving the teeth of the sprockets 26 which drive the conveyor. As shown in Fig. 2, the hook portions 39 project below the remainder of the link 12 and constitute slider elements which slidably travel on the runners 25, 25 and assist in supporting the apron during its travel through the housing 21. The rivets which engage the chain links 12 are designated 33a whereas the rivets which engage the clamping elements 13 are designated 33b.

The slat 15 mounts the slat slide 16 by means of rivets 17 passing through the slat and apertures in the base 42 of the slat slide 16. The slide 16 comprises the base and is provided with outturned legs 43, 43 which are offset downwardly from the base portion 42 and slidably engage in the grooves 36, 36 formed by the lips 35, 35 of the guide 11 (see Fig. 3). The body of the slat preferably is a wooden slat 45 formed as shown, with reduced end portions 46, 46 to travel under the sealing strip 22. In the illustrated embodiment of the invention, the central portion of the body 45 is provided with a plurality of projecting spikes or pins 48 to entrain the fibrous material. In certain installations, it may be desirable to omit the spikes 48.

The slide element 16 of the slat affords endwise sliding movement in the grooves 36, 36 so that removal and replacement of the slats is accomplished by removing the sealing strip 22 and simply displacing the slat transversely of the apron. The slat may be removed from one side of the housing and a new slat replaced from the same side, or the new slat may be used to eject the old slat by simply forcing the new slat against the end of the old slat to slide it from the opposite side of the housing, the opposite sealing strip 22 being removed.

Means is provided to prevent inadvertent lateral displacement of the slats. To this end, the slats are provided with apertures 51 which register with apertures 52 in the apron 10 and guide 11. A bolt 53 may then be passed through the slat body 45, the slat slide 16, the apron guide 11, the apron 10, and the clamping plate 13, and the bolt may be held in place by a nut 54 bearing against the bottom of the clamping member 13. Preferably, there is a second bolt 53 or other suitable fastener provided adjacent each opposite side edge of the conveyor to provide a two-point engagement of the slat with the apron.

While a particular embodiment of the present invention has been herein illustrated and described, it is not intended to limit the invention to such a disclosure, but changes and modifications may be made therein and thereto within the scope of the following claims.

We claim:

1. Stock feeding apparatus comprising a hopper having opposite side walls, an endless apron conveyor having upper and lower runs extending transversely across the hopper and beyond the opposite side walls thereof, said conveyor comprising a continuous apron, a plurality of guides mounted in spaced parallel relation on said apron transversely thereof and a like number of elongated flights having slides thereon and slidable longitudinally in said transverse guides, said flights having a reduced thickness overlying the marginal portions of said conveyor, said side walls including an elongated structural member overlying the marginal portion of said upper run and spaced upwardly from and substantially parallel to said upper run a distance greater than the maximum thickness of said flights, and a sealing strip releasably suspended from said structural member projecting into closely-spaced relation to the reduced end portions of said flights on the upper run of the conveyor inwardly of the side edges thereof to expose the outer marginal portions of said upper run, said flights being removable from said conveyor apron upon removal of said sealing strips and longitudinal displacement of said flights in said guides.

2. Apparatus according to claim 1 including releasable fasteners passing through each of said flights and the apron to secure the same against inadvertent longitudinal displacement of the flights in said guides.

3. Apparatus according to claim 1 including runners underlying and slidably supporting the marginal portions of said upper run in its travel under said sealing strip, the lower surface of the marginal portions of said apron having wear strips thereon slidable on said runners.

References Cited in the file of this patent
UNITED STATES PATENTS

| | | |
|---|---|---|
| 396,532 | Bramwell | Jan. 22, 1889 |
| 1,779,720 | Wood | Oct. 28, 1930 |
| 2,151,894 | Cambessedes | Mar. 28, 1939 |
| 2,395,761 | Reed | Feb. 26, 1946 |